(12) United States Patent
Miller

(10) Patent No.: US 9,163,943 B1
(45) Date of Patent: *Oct. 20, 2015

(54) SYSTEMS AND METHODS FOR USING MAGNETIC FIELD READINGS TO REFINE DEVICE LOCATION ESTIMATES

(71) Applicant: Google Inc., Mountain View, CA (US)

(72) Inventor: Christian Miller, Austin, TX (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,830

(22) Filed: May 7, 2014

Related U.S. Application Data

(63) Continuation of application No. 14/101,137, filed on Dec. 9, 2013, now Pat. No. 8,781,739.

(51) Int. Cl.

| | | |
|---|---|---|
| *G01C 21/00* | (2006.01) | |
| *G01S 5/02* | (2010.01) | |
| *G01S 5/16* | (2006.01) | |
| *G01V 3/08* | (2006.01) | |
| *G01S 13/00* | (2006.01) | |
| *G01B 7/004* | (2006.01) | |
| *G01S 19/00* | (2010.01) | |

(52) U.S. Cl.
CPC .............. *G01C 21/00* (2013.01); *G01S 5/0252* (2013.01); *G01S 5/16* (2013.01); *G01B 7/004* (2013.01); *G01S 13/00* (2013.01); *G01S 19/00* (2013.01); *G01V 3/08* (2013.01)

(58) Field of Classification Search
CPC ......... G01S 5/0252; G01S 5/16; G01S 13/00; G01S 19/00; G01B 7/004; G01V 3/08
USPC ........ 701/36, 300, 518, 525; 324/202, 207.26
See application file for complete search history.

(56) References Cited

U.S. PATENT DOCUMENTS

| | | |
|---|---|---|
| 4,710,708 A | 12/1987 | Rorden et al. |
| 4,816,634 A | 3/1989 | Lentz et al. |

(Continued)

FOREIGN PATENT DOCUMENTS

| | | |
|---|---|---|
| EP | 2 615 420 A2 | 7/2013 |
| EP | 2 662 700 A2 | 11/2013 |
| WO | WO 2011065931 | 3/2011 |

OTHER PUBLICATIONS

The Viterbi Algorithm, Center for Intelligent Machines, cim.mcgill.ca, Dec. 3, 2013, 4 pages.

(Continued)

*Primary Examiner* — Gertrude Arthur Jeanglaude
(74) *Attorney, Agent, or Firm* — Dority & Manning, P.A.

(57) ABSTRACT

Systems and methods for using magnetic field readings to refine device location estimates are provided. As an example, a plurality of magnetic field readings can be collected by a device as it travels along a path. A positioning system (e.g., GPS) or other sensors can be used to provide a coarse location for the device at each reading. A contribution to each of the magnetic field readings by the Earth's magnetic field can be removed to obtain a plurality of residual readings and a plurality of regions of interest along the path can be identified based at least in part on the residual readings. The regions of interest can be compared to each other to identify a plurality of correspondences between magnetic field readings or residual readings and the plurality of correspondences can be used to refine the location estimates.

20 Claims, 11 Drawing Sheets

(56) References Cited

U.S. PATENT DOCUMENTS

| | | | | |
|---|---|---|---|---|
| 5,319,374 | A | * | 6/1994 | Desai et al. ............... 342/387 |
| 5,576,973 | A | | 11/1996 | Haddy |
| 6,249,246 | B1 | | 6/2001 | Bode et al. |
| 8,781,739 | B1 | * | 7/2014 | Miller ............... 701/518 |
| 8,903,643 | B2 | * | 12/2014 | Nielsen et al. ............ 701/408 |
| 2008/0091345 | A1 | | 4/2008 | Patel et al. |
| 2008/0300748 | A1 | | 12/2008 | Drummy et al. |
| 2012/0143495 | A1 | | 6/2012 | Dantu |
| 2012/0245885 | A1 | | 9/2012 | Kimishima |
| 2013/0179074 | A1 | | 7/2013 | Haverinen |

OTHER PUBLICATIONS

Juang, Biing-Hwang, "Hidden Martov Models", Encyclopedia of Telecommunications 2003, DOI: 10.1002/0471219282.eot114, John Wiley and Sons, Apr. 15, 2003, Abstract.

Rabiner et al., "An Introduction to Hidden Markov Models", IEEE ASSP Magazine, Jan. 1986, p. 4-16.

Electromagnetic Articulography—http://clas.mq.edu.au/physiology/ema/index.html—9 pages.

Burgard et al., "Integrating Global Position Estimation and Position Tracking for Mobile Robots: They Dynamic Markov Localization Approach", IEEE/RSJ International Conference on Intelligent Robots and Systems, vol. 3, Victoria, Canada, Oct. 17, 1998—6 pages.

Cheng et al., "Towards a Magnetic Localization System for 3-D Tracking of Tongue Movements in Speech-Language Therapy", IEEE Engineering in Medicine and Biology Society, Minneapolis, Minnesota, Sep. 3-6, 2009, pp. 563-566.

Dellaert et al., "Square Root SAM: Simultaneous Localization and Mapping via Square Root Information Smoothing", The International Journal of Robotics Research, vol. 25, No. 12, Dec. 2006, pp. 1181-1203.

Gozick et al., "Magnetic Maps for Indoor Navigation", IEEE Transactions on Instrumentation and Measurement, vol. 6, No. 12, Dec. 2011, 9 pages.

Grandi, "A Simple Method to Approximate the Magnetic Field in the Vicinity of Overhead Power Lines", 5th IASTED International Conference on Power and Energy Systems, Tampa, Florida, Nov. 19-22, 2001—6 pages.

Li et al., "Using Geomagnetic Field for Indoor Positioning", International Global Navigation Satellite Systems Society Symposium, Outrigger Gold Cost, Qld Australia, Jul. 16-18, 2013, 12 pages.

Mamishev et al., "Measurement of Magnetic Fields in the Direct Proximity of Power Line Conductors", IEEE Transactions on Power Delivery, vol. 10, Issue 3, Jul. 1995, pp. 1211-1216.

Moore et al., "Magnetic Localization for Perching UAVs on Powerlines", International Conference on Intelligent Robots and Systems, San Francisco, California, Sep. 25-30, 2011, 8 pages.

Moore et al., "Powerline Perching with a Fixed-Wing UAV", Proceedings of the AIAA Infotech Aerospace Conference, Seattle Washington, Apr. 7-9, 2009, 16 pages.

Morelli et al., "Hidden Markov Models for Radio Localization in Mixed LOS/NLOS Conditions", IEEE Transactions on Signal Processing, vol. 55, Issue 4, Apr. 2007, 1525-1542.

Subbu et al., "LocateMe: Magnetic Fields Based Indoor Localization Using Smartphones", ACM Transactions on Intelligent Systems and Technology, vol. 4, Issue 4, Sep. 2013, 27 pages.

International Search Report for PCT/US2014/013135 dated Apr. 9, 2014, 4 pages.

Haverinen et al., "Global indoor self-localization based on the ambient magnetic field", Robotics and Autonomous Systems 57 (2009) 1028-1035.

Kim et al., "Indoor Positioning System Using Geomagnetic Anomalies for Smartphones", 2012 International Conference on Indoor Positioning and Indoor Navigation, New South Wales, Sydney, Australia, Nov. 13-15, 2012, 5 pages.

Vallivaara et al., "Magnetic field-based SLAM method for solving the localization problem in mobile robot floor-cleansing task", 15th International Conference on Advanced Robotics, Tallinn, Estonia, Jun. 20-23, 2011, 198-203.

Kemppi et al., "Use of artificial magnetic anomalies in indoor pedestrian navigation", Vehicular Technology Conference Fall, 2010 IEEE 72nd, Ottawa, ON, CA, Sep. 6, 2010, 5 pages.

* cited by examiner

US 9,163,943 B1

SYSTEMS AND METHODS FOR USING MAGNETIC FIELD READINGS TO REFINE DEVICE LOCATION ESTIMATES

PRIORITY CLAIM

This application is a continuation of and claims priority to U.S. patent application Ser. No. 14/101,137 entitled "Systems and Methods for Using Magnetic Field Readings to Refine Device Location Estimates" filed on Dec. 9, 2013.

FIELD

The present disclosure relates generally to determining a location of a device. More particularly, the present disclosure relates to systems and methods for using magnetic field readings to refine device location estimates.

BACKGROUND

Many devices commonly include various positioning systems to determine a current or past location of the device. For example, a smartphone, vehicle, or other device can be equipped with a global positioning system (GPS), accelerometers, gyroscopes, or other positioning systems to assist in determining a current location of the device at a particular time. Knowledge of the location of the device can assist in many endeavors, including navigation, data collection, or any other task in which knowledge of the location of the device is beneficial.

However, typical positioning systems and sensors generally suffer from some degree of noise, malfunction, or miscalculation. As such, positioning systems can be vulnerable to drift over long trajectories or sustained paths, resulting in location estimates which contain some degree of error.

As such, as an example, in the event that the path upon which a device travels in fact visits the same location upon two or more instances (e.g., exhibits a loop), the location of the device as determined by the positioning systems for such two or more instances may not perfectly align or otherwise correctly "close the loop."

SUMMARY

Aspects and advantages of the present disclosure will be set forth in part in the following description, or may be obvious from the description, or may be learned through practice of embodiments of the present disclosure.

One example aspect of the present disclosure is directed to a method for revising location estimates. The method includes obtaining, by one or more computing devices, a plurality of readings of a magnetic field collected by a magnetometer of a device. The plurality of readings are respectively associated with a plurality of location estimates of the device. The method includes obtaining, by the one or more computing devices, a plurality of residual readings by respectively removing a plurality of Earth magnetic field contributions from the plurality of readings. The plurality of Earth magnetic field contributions are respectively based at least in part on the plurality of location estimates and a magnetic field model. The method includes identifying, by the one or more computing devices, a plurality of regions of interest based at least in part on the plurality of residual readings. The method includes comparing, by the one or more computing devices, each region of interest with at least one other region of interest to identify a plurality of correspondences. The method includes revising, by the one or more computing devices, at least one of the plurality of location estimates based at least in part on the plurality of correspondences.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
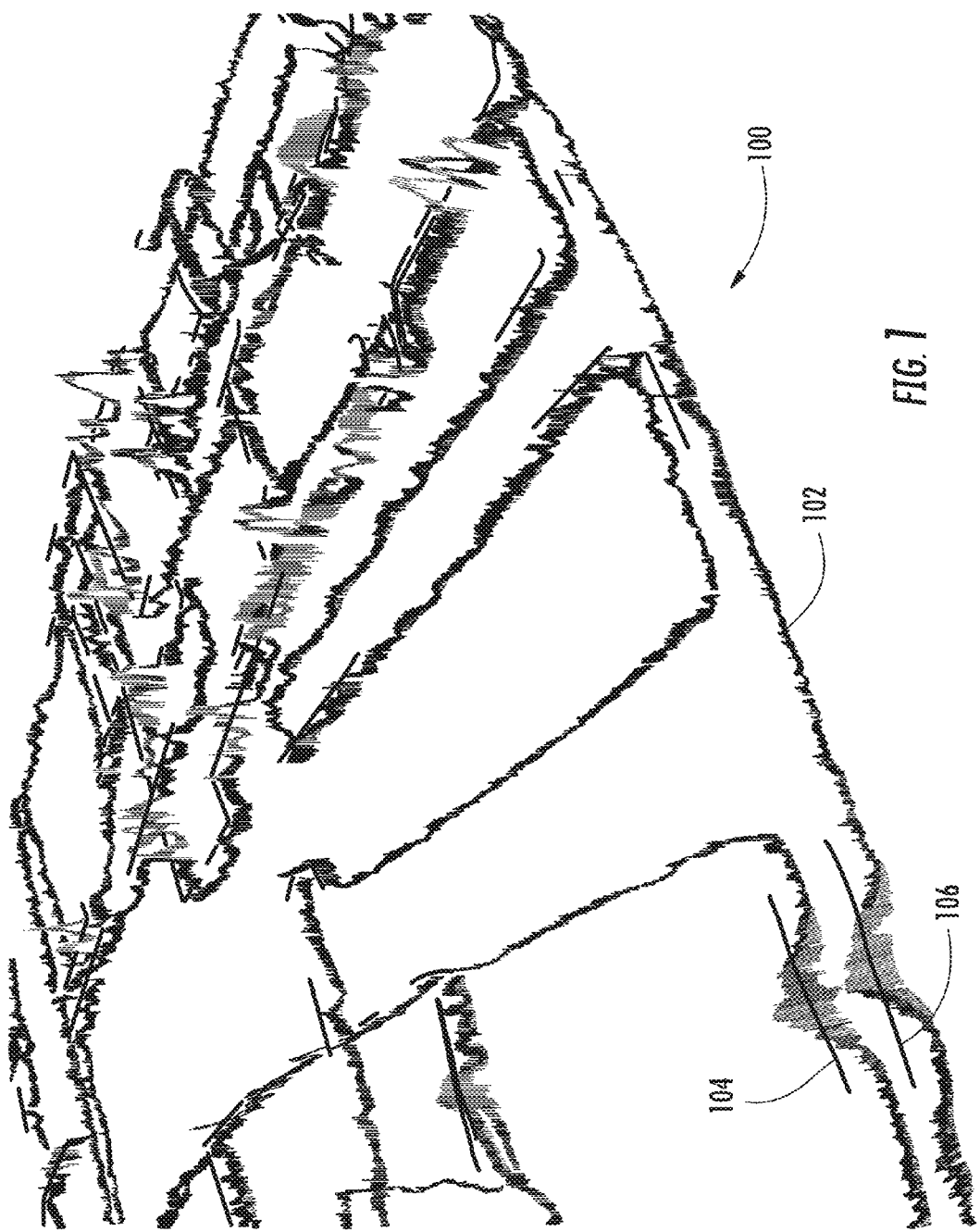
FIG. 1 depicts an illustration of a plurality of residual readings along a location path according to an example embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for using magnetic field readings to determine or refine a plurality of location estimates of a device, for example by determining whether obtained magnetic field data associated with a location estimate matches another location where a magnetic field reading has been previously obtained or is generally known. Such location determination can be used for many purposes, including determining the location of a device, closing loops exhibited by a location path traversed by a device, or other navigational actions. In particular, in some embodiments of the present disclosure, GPS data can be used to determine a coarse location of a device and then magnetic field data can subsequently be used as for finer-grained location determination.

More particularly, a plurality of magnetic field readings can be collected by a device as it travels along a path. A positioning system (e.g., GPS) or other sensors can be used to provide a location estimate for the device at each reading. A contribution to each of the magnetic field readings by the Earth's magnetic field can be removed to obtain a plurality of residual readings and a plurality of regions of interest along the path can be identified based on the residual readings. The regions of interest can be compared to each other to identify a plurality of correspondences between magnetic field readings or residual readings and the plurality of correspondences can be used to refine the location estimates. In such fashion, magnetic field data can be used to assist in determining locations and, for example, closing loops exhibited by the location path.

The systems and methods of the present disclosure can be used to assist in closing loops exhibited by a location path traversed by a device. One example application is a vehicle that is used to collect photographic imagery (e.g., imagery of one or more views from the vehicle as the vehicle travels along streets). Precise knowledge of the vehicle's location at the time of data capture (e.g., photograph capture) is essential to accurately place the photographic imagery within its global context and local counterparts.

Thus, the data collection vehicles typically employ various positioning systems or sensors (e.g. a global positioning system (GPS), accelerometers, gyroscopes, etc.) to determine an estimated location of the vehicle at a particular time. For example, the location of the vehicle can be estimated by optimizing a plurality of location estimates subject to a plurality of constraints respectively based on data obtained from the plurality of different positioning systems or sensors.

However, typical positioning systems and sensors generally suffer from noise and can be vulnerable to drift over long trajectories or sustained paths. Therefore, due to such noise and drift, in the event that the path upon which the vehicle travels in fact visits the same location upon two or more instances (e.g. exhibits a loop), the estimated location of the vehicle for such two or more instances may not perfectly align or otherwise "close the loop."

As such, one way of combatting sensor noise and drift is to recognize that the location path of the device visits the same location upon two or more instances and then revise the device location estimates so that such loops are closed. The systems and methods of the present disclosure can use magnetic field data to assist in recognizing and closing loops exhibited by the location path.

According to an aspect of the present disclosure, a device can collect a plurality of magnetic field readings as it travels along a path. For example, the device can include a magnetometer that outputs three-dimensional magnetic field vector readings.

A location estimate and orientation can be determined for the device at each instance in which a magnetic field reading is collected. For example, the location estimate and/or orientation can be based on data obtained from various positioning systems or sensors, including, for example, GPS, accelerometers, or gyroscopes.

An estimated contribution to each of the magnetic field readings by the Earth's magnetic field can be determined and removed so that the remaining residual readings reflect only magnetic field disturbances. For example, magnetic field disturbances can be caused by power lines, ferromagnetic objects, large permanent magnets, or other magnetic objects or events. Importantly, such disturbances are generally identifiable and consistent over time, meaning that identifying a given disturbance at two different instances along the device location path implies that the device has visited the same location twice.

As an example, the estimated Earth magnetic field contribution to each magnetic field reading can be determined by consulting a magnetic field model in view of the location estimate associated with the device at the time such reading was collected. In some implementations, removing the estimated Earth-field contribution from each magnetic field reading can include rotating the three-dimensional magnetic field reading vector from a device coordinate frame to a global coordinate frame based on the estimated orientation of the device at the time such reading was collected and then subtracting a three-dimensional Earth-field vector from the rotated magnetic field reading vector to obtain a residual reading.

According to another aspect of the present disclosure, a plurality of regions of interest can be identified along the device location path. As an example, each residual reading having a vector magnitude greater than a threshold magnitude can be identified and a region of interest can be developed around each of such identified residual readings. For example, all readings collected within a given period of time from the identified residual reading can be identified as belonging to a single region of interest. Identifying discrete regions of interest for subsequent comparison assists in rendering the systems and methods of the present disclosure scalable to large collections of data or for real-time navigational purposes.

In some embodiments, the regions of interest can each include a plurality of the raw magnetic field readings (e.g., without the Earth contribution removed) along with any associated location estimate data. In other embodiments, the regions of interest can each include a plurality of the residual readings and their associated location estimate data.

According to yet another aspect of the present disclosure, each of the regions of interest can be compared to at least one other region of interest to identify a plurality of correspondences. In some implementations, each region of interest can be paired with each other region of interest that is within a threshold distance, and each pair of regions of interest can be compared to identify the plurality of correspondences. For example, each correspondence can match two readings together as likely corresponding to the same location.

According to an aspect of the present disclosure, a pair of regions of interest can be compared by performing a dynamic, non-linear time warping algorithm to identify the plurality of correspondences. For example, in embodiments in which each region of interest includes a plurality of raw magnetic field readings, performing the time warping algorithm can include generating a comparison table by computing a plurality of comparison values for a plurality of pairs of magnetic field readings according to a comparison function. The plurality of pairs of magnetic field readings can include each magnetic field reading included in a first paired region of interest paired with each magnetic field reading included in a second paired region of interest.

As an example, in such embodiments, the comparison function can be a weighted sum of a squared difference between a first and second input magnetic field reading and a squared distance between a first and second location estimate respectively associated with the first and second input magnetic field readings.

As another example, in embodiments in which each region of interest includes a plurality of residual readings, performing the time warping algorithm can include generating a comparison table by computing a plurality of comparison values for a plurality of pairs of residual readings according to a comparison function. The plurality of pairs of residual readings can include each residual reading included in a first paired region of interest paired with each magnetic field reading included in a second paired region of interest.

As an example, in such embodiments, the comparison function can be a weighted sum of a squared difference between a first and second input residual reading, a squared distance between a first and second location estimate respectively associated with the first and second input residual readings, and a squared difference between a first and second heading respectively associated with the first and second input residual readings.

Once the comparison table has been generated, a cost table containing a plurality of cost values can be generated based on the comparison table. In particular, a final cost value can be selected for each pair of magnetic field readings or pair of residual readings included in the comparison table. The final cost value for each pair can be the minimum of a first, second, and third cost value. More particularly, according to an aspect of the present disclosure and unlike certain existing dynamic time warping algorithms, the first and third cost values can include a constant skipcost value that permits the algorithm to skip aligning a particular sample to a counterpart.

A direction table can then be generated or determined based on the cost table. The direction table can include a direction value for each pair of magnetic field readings or pair of residual readings included in the cost table. The direction value for each pair can be based on the previously performed selection of the first, second, or third cost value as the final cost value for such pair.

An alignment can then be identified based on the direction table. For example, the alignment can be identified by starting at the end of the two regions of interest being compared (e.g., at an upper-right-hand corner of the direction table) and then traversing the direction table according to the direction values. Each pair of readings traversed can be included in the alignment.

According to an aspect of the present disclosure, one of the plurality of correspondences can be emitted or otherwise identified for each instance in which the alignment traverses a pair of readings providing a diagonal step value and for which the comparison value associated with such pair of readings is less than the constant skipcost value. Thus, performing the dynamic time warping algorithm for each pair of regions of interest that are within a given distance of each other can serve to identify a significant number of correspondences.

According to another aspect of the present disclosure, in some implementations, the dynamic time warping algorithm can be performed for each pair of regions of interest in both the forwards and backwards direction. Performing the algorithm in the backwards direction can assist in identifying correspondences associated with instances in which the device traversed the same location twice but was travelling in opposite directions.

More particularly, in embodiments in which each region of interest includes a plurality of raw magnetic field readings, performing the time warping algorithm in a backwards direction can include rotating each of the plurality of magnetic field readings included in one of the regions of interest 180 degrees about a vertical axis. The time warping algorithm can then be performed as discussed above.

As another example, in embodiments in which each region of interest includes a plurality of residual readings, performing the time warping algorithm in the backwards direction can include negating the heading associated with each of the plurality of residual readings included in one of the regions of interest and then again performing the time warping algorithm as discussed above.

After the plurality of correspondences have been identified, the location estimates of the device can be refined or otherwise re-estimated. As an example, a constraint can be generated for each identified match. For example, the constraint can provide a penalty proportional to a distance between the two components of the match.

The generated constraints can be input into a global optimizer along with any additional constraints generated from additional location estimate data. For example, the original data from GPS or other positions systems or sensors can have previously been analyzed to provide constraints that resulted in the original location estimates. The global optimizer can improve or refine the path of the device over all inputted constraints and data. In such fashion, magnetic field readings can be used to assist in closing location overlaps exhibited by a location path traversed by a device.

With reference now to the FIGS., example embodiments of the present disclosure will be discussed in further detail. FIG. 1 depicts an illustration 100 of a plurality of residual readings along a location path 102 according to an example embodiment of the present disclosure. In particular, illustration 100 represents each of the plurality of residual readings as a vertical bar having a magnitude indicative of the vector magnitude of a magnetic field disturbance observed at the location of the vertical bar. Illustration 100 provides a perspective rendering of the vertical bars.

Thus, the plurality of residual readings included in location path 102 can represent magnetic field disturbances determined by removing an Earth magnetic field contribution from each of a plurality of a magnetic field readings obtained by a device as it travelled along location path 102. Furthermore, although the plurality of residual readings are respectively represented in illustration 100 as a plurality of vertical bars of varying magnitude, it should be understood that, in some implementations, the residual readings can include three-dimensional magnetic field disturbance data (e.g., according to a global x-axis, a global y-axis, and a global z-axis).

According to an aspect of the present disclosure, a plurality of regions of interest can be identified along location path 102. As an example, in some implementations, the plurality of regions of interest can be identified by identifying each residual reading having a vector magnitude greater than a threshold value and then selecting a group of residual readings surrounding each of identified residual reading.

With respect to illustration 100, each region of interest identified along location path 102 has been visually designated as a region of interest by placing a bar, such as bar 104 or bar 106, over the region of interest. The systems and methods of the present disclosure can be used to identify such regions of interest and then compare them to identify a plurality of correspondences.

In particular, the regions of interest respectively designated by bar 104 and bar 106 appear to reflect repeated observation of the same magnetic field disturbance. Therefore, according to the present disclosure, the accuracy of location path 102 can be improved by identifying a plurality of correspondences between the two regions of interest and then constraining location path 102 to reduce the distance between the correspondences.

Figure 2:
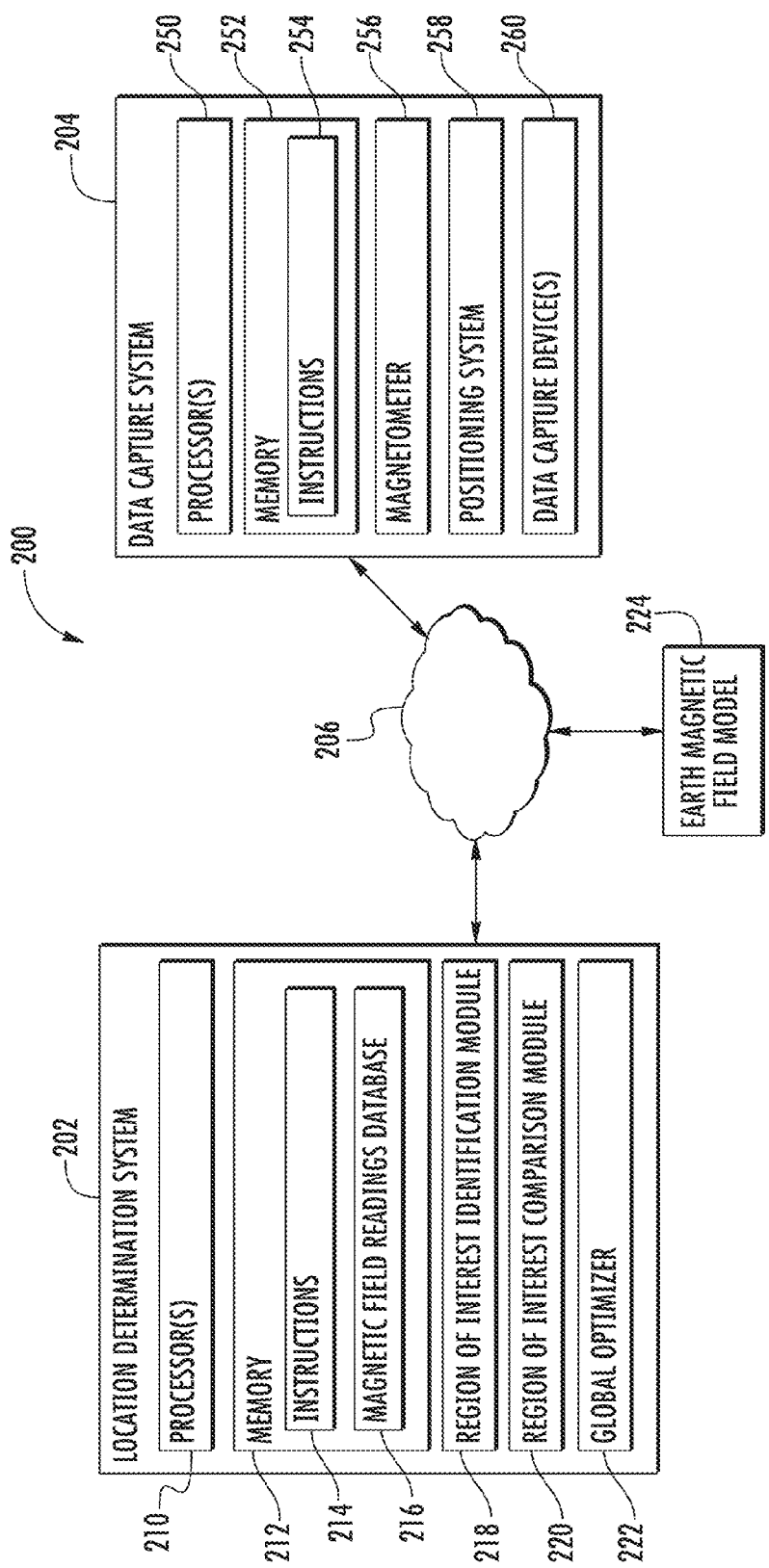
FIG. 2 depicts an example system for using magnetic field readings to refine device location estimates according to an example embodiment of the present disclosure.

FIG. 2 depicts an example system 200 for using magnetic field readings to refine device location estimates according to an example embodiment of the present disclosure. System 200 can include a location determination system 202 in communication with a data capture system 204 over a network 206.

Location determination system 202 can include one or more computing devices. Furthermore, any computing tasks or functionality provided by location determination system 202 can performed by the one or more computing devices in any combination of a parallel or distributed computing environment.

Location determination system 202 can include one or more processors 210 and a memory 212. Processor 210 can be one processor or can be a plurality of processors which are operably connected. The memory 212 can store instructions 214 that, when executed by processor 210, cause processor 210 to perform operations in accordance with the present disclosure.

Memory 212 can also include a magnetic field readings database 216. Database 216 can be implemented across one or more storage devices and can be located locally or located remotely and accessed over network 206. Magnetic field readings database 216 can include a plurality of magnetic field readings respectively associated with a plurality of location estimates. As an example, in some implementations, magnetic field readings database 216 can store magnetic field data previously captured by data capture system 204 and transmitted to location determination system 202 over network 206.

Location determination system 202 can also include any number of modules which provide additional functionality, including, for example, a region of interest identification module 218, a region of interest comparison module 220, and a global optimizer 222.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Location determination system 202 can implement region of interest identification module 218 to perform operations to identify a plurality of regions of interest. For example, in some implementations, region of interest identification module 218 can be implemented to remove a contribution of the Earth's magnetic field from each of a plurality of magnetic field readings to obtain a plurality of residual readings and identify a plurality of regions of interest based on the plurality of residual readings.

Location determination system 202 can implement region of interest comparison module 220 to perform operations to compare two or more regions of interest to identify a plurality of correspondences. For example, in some implementations, region of interest comparison module 220 can be implemented to perform a time warping algorithm that compares a plurality of samples included in a pair of regions of interest to identify the plurality of correspondences between such samples. As an example, the time warping algorithm can result in monotonic non-linear matching of samples.

Location determination system 202 can implement global optimizer 222 to perform operations to improve or refine one or more functions or other data (e.g., location estimate data) according to criteria or in view of a plurality of constraints. For example, in some implementations, global optimizer 222 can be implemented to improve or refine a plurality of location estimates of data capture system 204 in light of data obtained from one or more positioning systems and/or constraints generated in view of a plurality of identified correspondences.

Location determination system 202 can include or can access over network 206 an Earth magnetic field model 224. Earth magnetic field model 224 can provide a model of the magnetic field of the Earth for a given location. In one implementation, the Earth magnetic field model 224 is an online calculator provided by the United States government. As another example, the Earth magnetic field model 224 can be produced by a software and data package implemented locally at location determination system 202.

Data capture system 204 can include one or more processors 250 and a memory 252. Processor 250 can be one processor or a plurality of processors operably connected. The memory 252 can store instructions 254 that, when executed by processor 250, cause processor 250 to perform operations in accordance with the present disclosure.

In an example implementation, the data capture system 204 can be a part of a data collection vehicle used to collect photographs of geographic imagery used to generate street level images, such as imagery of the view from the vehicle as the vehicle travels along streets or other pathways. As other examples, data capture system 204 can be a smartphone, a computing device attached to a backpack or other wearable item, a camera, a component of a military vehicle, an aircraft, a navigational device, an emergency location broadcast device, a robotic device, or any other device or system for which knowledge of the location of the device or system is beneficial.

Data capture system 204 can include a magnetometer 256, a positioning system 258, and one or more data capture devices 260. Magnetometer 256 can be any measuring instrument capable of measuring the strength and direction of a magnetic field. Magnetometer 256 can be a single sensor, instrument, or device or can be a plurality of devices operably connected. In some implementations, magnetometer 256 can output a reading of the magnetic field surrounding magnetometer 256 in the form of a three-dimensional magnetic field vector defined with respect to a local coordinate frame associated with data capture system 204.

Positioning system 258 can estimate a current geographic location of data capture system 204. The positioning system 258 can be any device or circuitry for analyzing the position of the data capture system 204. For example, the positioning system 258 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. In some implementations, data capture system 204 can respectively associate in memory a plurality of location estimates determined by positioning system 258 with a plurality of magnetic field readings generated by magnetometer 256.

In addition, in some implementations, positioning system 258 can further include one or more devices or instruments to assist in determining an orientation of data capture system 204. For example, positioning system 258 can include a gyroscope, accelerometers, or inertial measurement units to determine the orientation of data capture system 204 in three-dimensional space. In some implementations, data capture system 204 can respectively associate in memory a plurality of orientations determined by positioning system 258 with a plurality of magnetic field readings generated by magnetometer 256.

Data capture system 204 can also include one or more data capture devices 260. Data capture device 260 can capture data associated with the physical environment surrounding data capture system 204. Data capture device 260 can take many various forms, including a laser scanner, camera, radar device, sonar device, infrared device, weather monitoring device, WiFi broadcast device locator, or other suitable data capture device. Thus, captured data can be data generated from a laser scanner, a plurality of images captured by a camera and used to create panoramic images, weather condition data, or other suitable forms of data. Captured data can be stored in memory 252 and, in some implementations, can be associated with a particular estimated location of capture or particular orientation of capture as determined by positioning system 258.

Data capture system 204 can transmit data to location determination system 202 over network 206. For example, data capture system 204 can provide magnetic field readings, location estimates, and orientations to location determination system 202. As an example, such transmitted information can be stored in magnetic field readings database 216.

Network 206 can be any type of communications network, such as a local area network (e.g., intranet), wide area network (e.g., Internet), or some combination thereof and can include any number of wired or wireless links. In general, communication between the location determination system 202 and data capture system 204 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, while location determination system 202 and data capture system 204 are depicted in FIG. 2 as being separate systems, such depiction is provided by way of example only. In particular, in some embodiments of the present disclosure, location determination system 202 can be a component of or otherwise included in data capture system 204. In addition, determination or refinement of the location estimate of data capture system 204 by location determination system 202 can be performed in real-time or can be performed as post-data collection batch processing.

Figure 3:
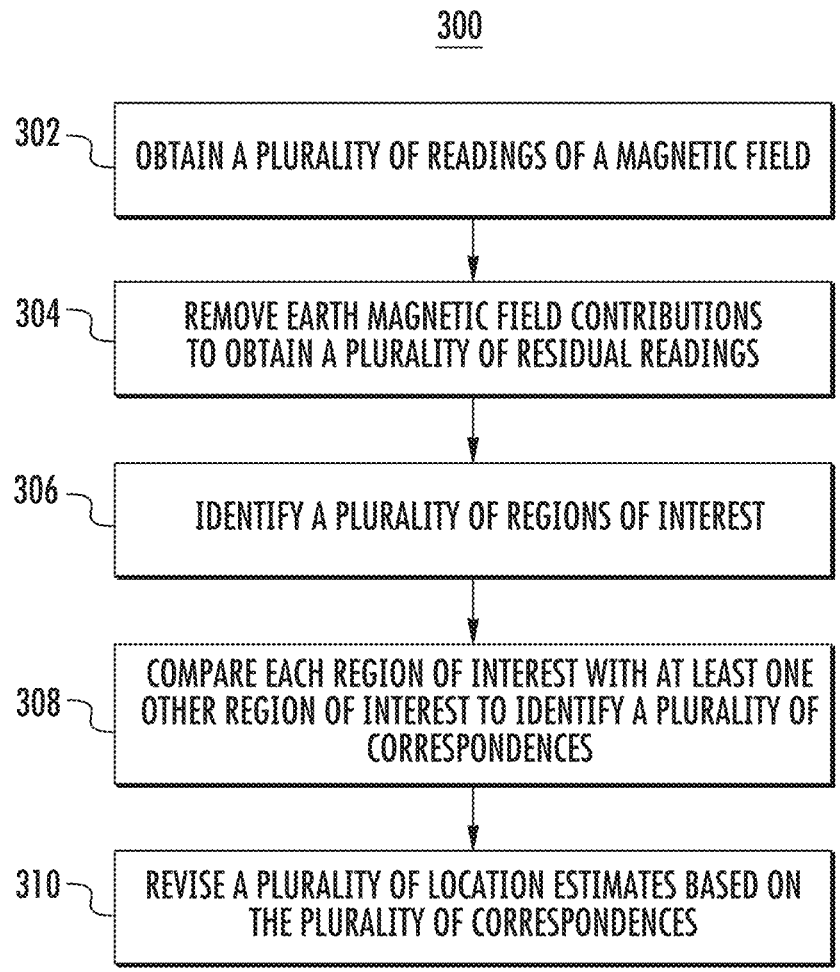
FIG. 3 depicts a flow chart of an example method for using magnetic field readings to refine device location estimates according to an example embodiment of the present disclosure.

FIG. 3 depicts a flow chart of an example method (300) for using magnetic field readings to refine device location estimates according to an example embodiment of the present disclosure. Although method (300) will be discussed with reference to system 200 of FIG. 2, method (300) can be performed by any suitable computing system.

In addition, FIG. 3 depicts steps performed in a particular order for purposes of illustration and discussion. Those of ordinary skill in the art, using the disclosures provided herein, will understand that the various steps method (300) can be omitted, adapted, and/or rearranged in various ways without departing from the scope of the present disclosure.

At (302) a plurality of readings of a magnetic field can be obtained. As an example, data capture system 204 can operate magnetometer 256 to collect a plurality of magnetic field readings as it travels along a path. Each of the magnetic field readings can be associated with a particular location estimate and orientation as determined by positioning system 258. Data capture system 204 can provide the magnetic field readings and associated location estimate and orientation data to location determination system 202 over network 206.

At (304) a plurality of Earth magnetic field contributions can be respectively removed from the plurality of readings obtained at (302) in order to obtain a plurality of residual readings. As an example, location determination system 202 can consult Earth magnetic field model 224 to determine an estimated contribution by the Earth's magnetic field to each of the plurality of magnetic field readings based on the plurality of location estimates respectively associated with the plurality of magnetic field readings. The estimated contribution to each magnetic field reading can be removed to obtain the residual reading.

At (306) a plurality of regions of interest can be identified. As an example, location determination system 202 can implement region of interest identification module 218 to identify the plurality of regions of interest. In some embodiments, each region of interest includes a plurality of magnetic field readings and their associated location estimate data and/or orientation data. In other embodiments, each region of interest includes a plurality of residual readings and their associated location estimate data and/or orientation data.

At (308) each region of interest can be compared with at least one other region of interest so as to identify a plurality of correspondences. As an example, location determination system 202 can implement region of interest comparison module 220 to compare two or more regions of interest and identify the plurality of correspondences.

At (310) a plurality of location estimates can be revised based on the plurality of correspondences identified at (308). As an example, location determination system 202 can implement global optimizer 222 to improve or revise the location estimates associated with the magnetic field readings based on a plurality of constraints respectively generated in view of the plurality of correspondences identified at (308).

Figure 4:
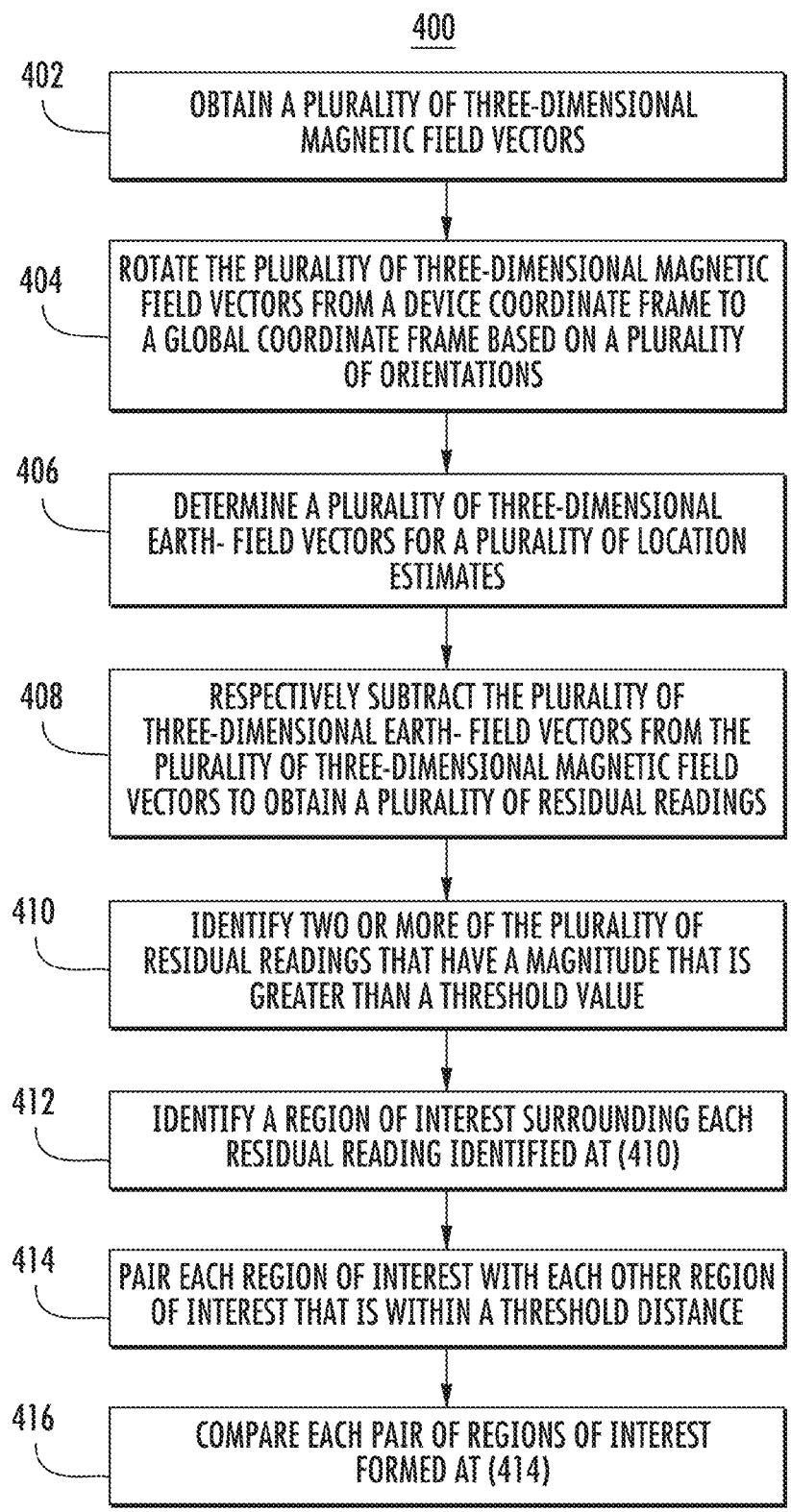
FIG. 4 depicts a flow chart of an example method for using magnetic field readings to refine device location estimates according to an example embodiment of the present disclosure.

FIG. 4 depicts a flow chart of an example method (400) for using magnetic field readings to refine device location estimates according to an example embodiment of the present disclosure. Method (400) can be performed by any suitable computing system, including system 200 of FIG. 2.

In addition, FIG. 4 depicts steps performed in a particular order for purposes of illustration and discussion. Those of ordinary skill in the art, using the disclosures provided herein, will understand that the various steps method (400) can be omitted, adapted, and/or rearranged in various ways without departing from the scope of the present disclosure.

At (402) a plurality of three-dimensional magnetic field vectors can be obtained. For example, a magnetometer of a device can output magnetic field readings in the form of three-dimensional magnetic field vectors expressed with respect to a device coordinate frame.

At (404) the plurality of three-dimensional magnetic field vectors can be rotated from the device coordinate frame to a global coordinate frame based on a plurality of orientations respectively associated with the three-dimensional magnetic field vectors. For example, one or more rotation matrices can be generated based on each orientation and can be used to rotate each three-dimensional magnetic field vector.

At (406) a plurality of three-dimensional Earth-field vectors can be determined for a plurality of location estimates. In particular, each three-dimensional Earth-field vector for each location estimate can indicate the direction and strength of the Earth's magnetic field at the location estimate at a particular time. Determining the plurality of three-dimensional Earth-field vectors at (406) can include consulting a computational resource.

At (408) the plurality of three-dimensional Earth-field vectors can be respectively subtracted from the plurality of three-dimensional magnetic field vectors to respectively obtain a plurality of residual readings. Thus, the plurality of residual readings can generally represent magnetic field disturbances.

At (410) two or more of the plurality of residual readings that have a magnitude that is greater than a threshold value can be identified.

At (412) a region of interest can be identified around each residual reading identified at (410). As an example, in some embodiments, each region of interest for each residual reading identified at (410) can include the three-dimensional magnetic field vector associated with such residual reading and all other three-dimensional magnetic field vectors collected within a threshold time before or after the three-dimensional magnetic field vector associated with such residual reading.

As another example, in other embodiments, each region of interest for each residual reading identified at (410) can include the residual reading and all other residual readings determined based on three-dimensional magnetic field vectors collected within a threshold time before or after the three-dimensional magnetic field vector associated with such residual reading was collected.

At (414) each region of interest can be paired with each other region of interest that is within a threshold distance. At (416) each pair of regions of interest formed at (414) can be compared to identify a plurality of correspondences.

Figure 5:
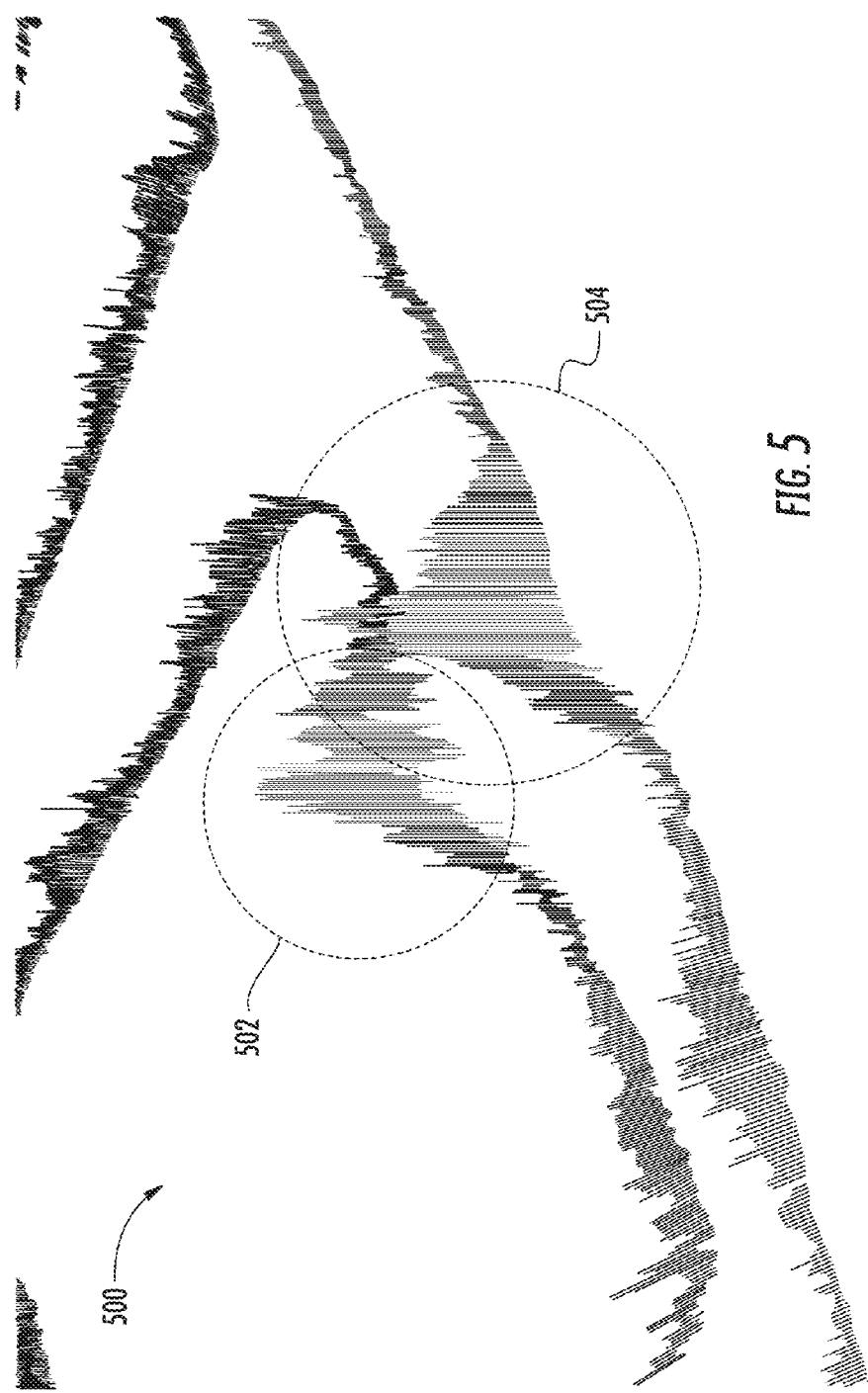
FIG. 5 depicts an illustration of a pair of regions of interest according to an example embodiment of the present disclosure.

As an example, FIG. 5 depicts an illustration 500 of a pair of regions of interest 502 and 504 according to an example embodiment of the present disclosure. According to aspects of the present disclosure, regions of interest 502 and 504 can be compared to each other to identify a plurality of correspondences.

Figure 6:
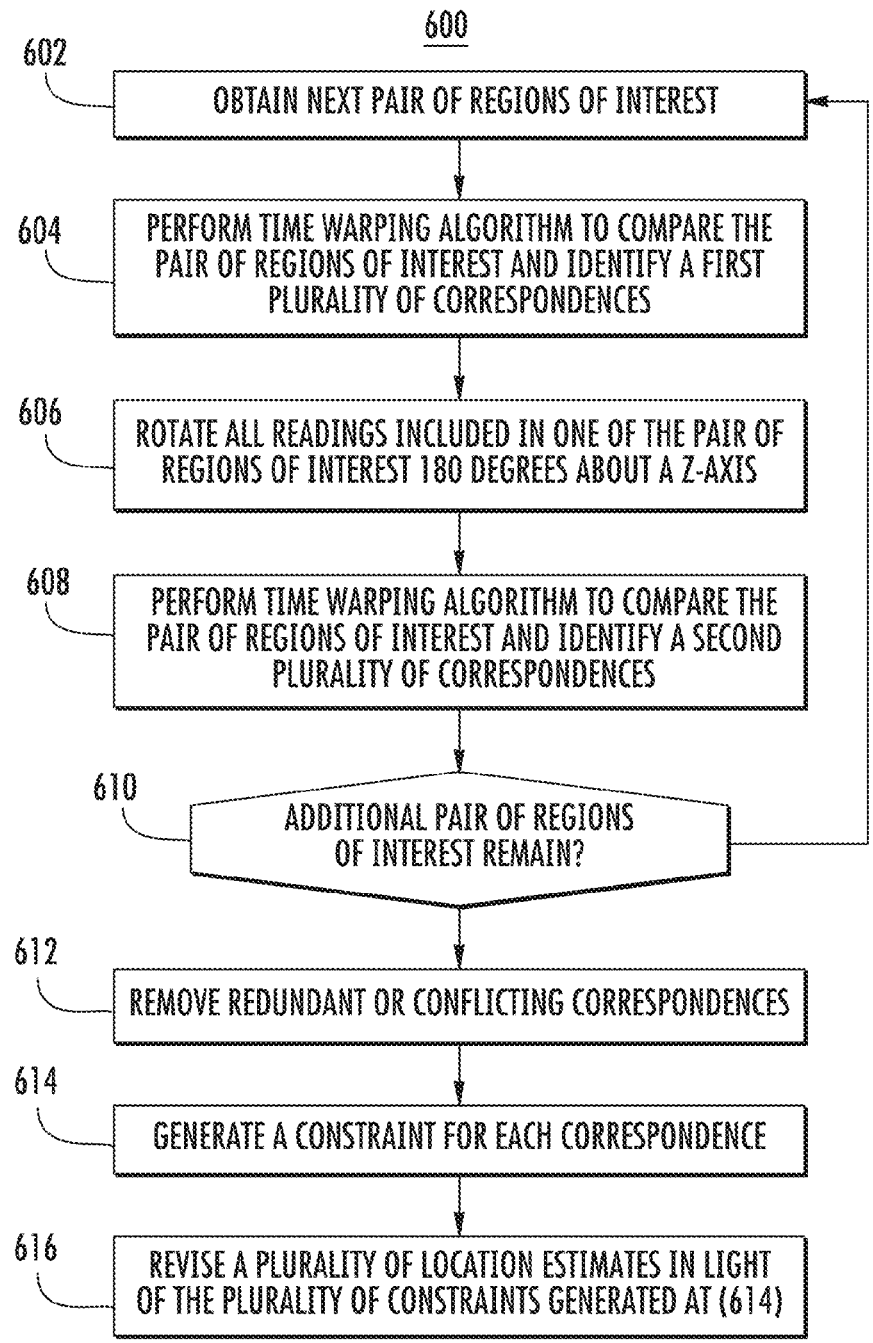
FIG. 6 depicts a flow chart of an example method for using magnetic field readings to refine device location estimates according to an example embodiment of the present disclosure.

FIG. 6 depicts a flow chart of an example method (600) for using magnetic field readings to refine device location estimates according to an example embodiment of the present disclosure. Method (600) can be performed by any suitable computing system, including system 200 of FIG. 2.

In particular, method (600) can be performed to refine device location estimates in embodiments of the present disclosure in which each region of interest comprises a plurality of raw magnetic field readings (e.g., without the Earth contribution removed) and their associated location estimate data. For example, each magnetic field reading can be a three-dimensional magnetic field vector.

In addition, FIG. 6 depicts steps performed in a particular order for purposes of illustration and discussion. Those of ordinary skill in the art, using the disclosures provided herein, will understand that the various steps method (600) can be omitted, adapted, and/or rearranged in various ways without departing from the scope of the present disclosure.

At (602) the next pair of regions of interest can be obtained or otherwise considered. For example, a plurality of pairs of regions of interest can be formed and ordered into a sequence according to any logic. Each pair of region of interest can be then considered individually.

At (604) a time warping algorithm can be performed to compare the pair of regions of interest most recently obtained at (602). The result of performing the time warping algorithm can be the identification of a first plurality of correspondences.

Figure 7:
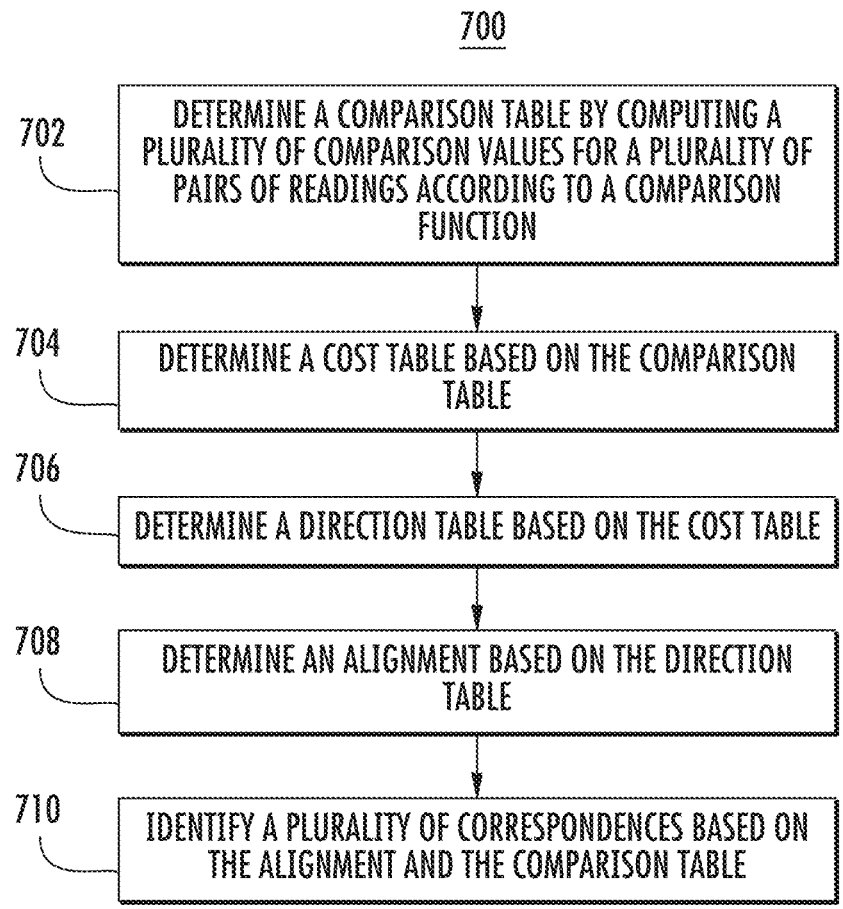
FIG. 7 depicts a flow chart of an example method for comparing a pair of regions of interest according to an example embodiment of the present disclosure.

As an example, FIG. 7 depicts a flow chart of an example method for comparing a pair of regions of interest according to an example embodiment of the present disclosure. Method (700) can be performed by any suitable computing system, including system 200 of FIG. 2.

In particular, method (700) can be performed to compare a pair of regions of interest in embodiments of the present disclosure in which each region of interest comprises a plurality of raw magnetic field readings (e.g., without the Earth contribution removed) and their associated location estimate data. For example, each magnetic field reading can be a three-dimensional magnetic field vector.

In addition, FIG. 7 depicts steps performed in a particular order for purposes of illustration and discussion. Those of ordinary skill in the art, using the disclosures provided herein, will understand that the various steps method (700) can be omitted, adapted, and/or rearranged in various ways without departing from the scope of the present disclosure.

At (702) a comparison table can be determined by computing a plurality of comparison values for a plurality of pairs of magnetic field readings according to a comparison function. In particular, the plurality of pairs of readings can include each magnetic field reading included in a first region of interest respectively paired with each magnetic field reading included in a second region of interest.

As an example, if the first region of interest being compared contains a first number (N) of magnetic field readings and the second region of interest being compared contains a second number (M) of magnetic field readings, then the comparison table determined at (702) can be of size N*M. For example, an example comparison table can have N rows and M columns and can hold a comparison value (COMPARE(i, j)) for each of the plurality of pairs of readings ($1 \leq i \leq N$, $1 \leq j \leq M$). However, the comparison table does not necessarily have any particular formatting, but rather, in some implementations, can exist solely as a plurality of comparison values stored in memory and associated with a particular pair of magnetic field readings.

The comparison value computed for each pair of magnetic field readings can be computed according to a comparison function. As an example, the comparison function can output a comparison value for two input magnetic field readings by computing a weighted sum of a squared difference between the two input magnetic field readings and a squared distance between two location estimates respectively associated with the two input magnetic field readings. For example, the squared difference can be computed by performing vector subtraction and then squaring the result. The weightings used in the comparison function can be adjusted to provide an appropriate weight for each component of the comparison function.

At (704) a cost table can be determined based on the comparison table. As an example, the cost table can have N rows and M columns and can hold a final cost value (COST(i, j)) for each of the plurality of pairs of readings ($1 \leq i \leq N$, $1 \leq j \leq M$). However, the cost table does not necessarily have any particular formatting, but rather, in some implementations, can exist solely as a plurality of final cost values stored in memory and associated with a particular pair of magnetic field readings.

The final cost value for each of the plurality of pairs of readings can be determined by selecting the minimum of a first cost value (C1), a second cost value (C2), and a third cost value (C3). For example, the first, second, and third cost values can have the following identities:

$$C1(i,j)=COST(i-1,j)+SKIPCOST;$$

$$C2(i,j)=COST(i-1,j-1)+COMPARE(i,j);$$

$$C3(i,j)=COST(i,j-1)+SKIPCOST;$$

According to an aspect of the present disclosure, the skipcost value (SKIPCOST) can be a constant value. Thus, the skipcost value can represent the cost of skipping a magnetic field reading in one of the regions of interest being compared. Such inclusion of the skipcost value in the first and third cost values contrasts with certain existing time warping algorithms and provides the benefit of allowing the time warping algorithm to identify improved subsequences or sub-alignments while skipping through portions where a satisfactory alignment is not present.

According to another aspect of the present disclosure, the magnitude of the skipcost value can be adjusted to allow more or less skipping by the time warping algorithm. For example, a larger skipcost value will result in increased selection of the second cost value as the final cost value (e.g., less skipping).

At (706) a direction table can be determined based on the cost table. As an example, the direction table can have N rows and M columns and can hold a direction value (DIR(i, j)) for each of the plurality of pairs of readings ($1 \leq i \leq N$, $1 \leq j \leq M$). However, the direction table does not necessarily have any particular formatting, but rather, in some implementations, can exist solely as a plurality of direction values stored in memory and associated with a particular pair of magnetic field readings.

The direction value for each of the plurality of pairs of readings can be determined based on the selection of final cost value performed at (704). For example, the direction value for each of the plurality of pairs of readings can be determined according to the following:

$$DIR(i,j)=(-1,0) \text{ if } COST(i,j)=C1(i,j);$$

$$DIR(i,j)=(-1,-1) \text{ if } COST(i,j)=C2(i,j);$$

$$DIR(i,j)=(0,-1) \text{ if } COST(i,j)=C3(i,j);$$

Thus, the direction values of the direction table can provide an indication of the relationship selected by the corresponding cost value in the cost table.

At (708) an alignment can be determined based on the direction table. For example, the alignment can be determined by starting at the end of the two regions of interest being compared (e.g. at (N, M)) and then traversing the direction table according to the direction values. In particular, if the direction value at a given pair of magnetic field readings is (−1, 0), then the alignment can take a leftwards step; if the direction value is (−1, −1), then the alignment can take a diagonal step; and if the direction value is (0, −1), then the alignment can take a downwards step.

However, it will be understood that such step directions are provided by way of example and that determination of the alignment at (708) can be performed without creation of a table according to a particular formatting. As an example, if the direction value at a pair of magnetic field readings (i, j) traversed by the alignment is (−1, −1), then the alignment can be determined to proceed to the pair of magnetic field readings (i−1, j−1).

Furthermore, although determination of the cost table and the direction table are presented in method (700) as discrete steps, it will be appreciated that, in some implementations, the cost value and direction value for each pair of magnetic field readings can be determined at the same time such that cost table and the direction table are concurrently determined.

Figure 8A:
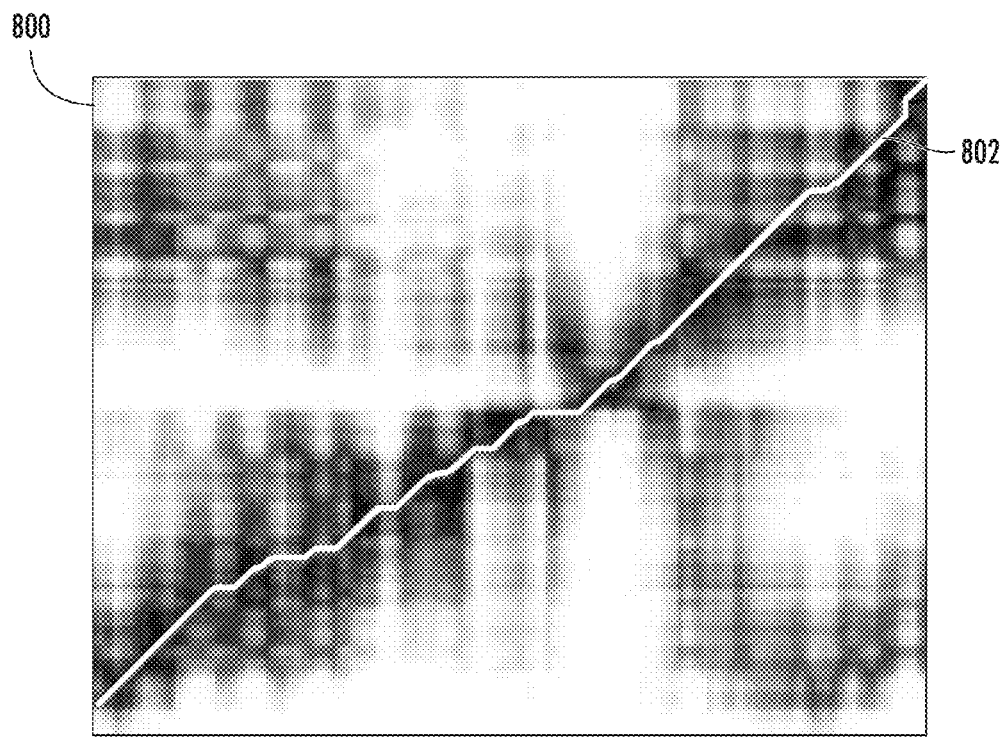
FIG. 8A depicts an example illustration of a comparison table according to an example embodiment of the present disclosure.

FIG. 8A depicts an example illustration 800 of a comparison table according to an example embodiment of the present disclosure. As shown in FIG. 8A, shading has been used to provide an indication of the comparison values included in the comparison table of illustration 800. In particular, lighter shades have been used to illustrate areas of the comparison table which provide large comparison values while darker shades have been used to illustrate areas of the comparison table which provide small comparison values. As discussed above, larger comparison values generally indicate a relatively poor match while smaller comparison values generally indicate a relatively good match.

Also shown in FIG. 8A is an alignment 802. Alignment 802 can have been determined by starting at the upper-right-hand corner of the corresponding direction table and traversing that direction table according to the direction values encountered. As shown in FIG. 8A, superimposing alignment 802 on the comparison table of illustration 800 demonstrates that the alignment generally follows area of darker shading, indicating that alignment 802 includes a significant number of relatively good matches.

Returning to FIG. 7, at (710) a plurality of correspondences can be identified based on the alignment determined at (708) and the comparison table determined at (702). In particular, a correspondence can be emitted or otherwise identified for each instance in which the direction value for pair of magnetic field readings traversed by the alignment determined at (708) provides a diagonal step and the comparison value is less than the skipcost value. In other words, a correspondence can be emitted for each pair of magnetic field readings traversed by the alignment for which DIR(i, j)=(−1, −1) and COMPARE(i, j)<SKIPCOST. The second requirement that the comparison value be less than the skipcost value ensures that correspondences are only emitted when the pair of magnetic field readings represent a match of acceptable quality and, therefore, avoids emitting correspondences when a diagonal step is taken only to achieve an improved global alignment.

Figure 8B:
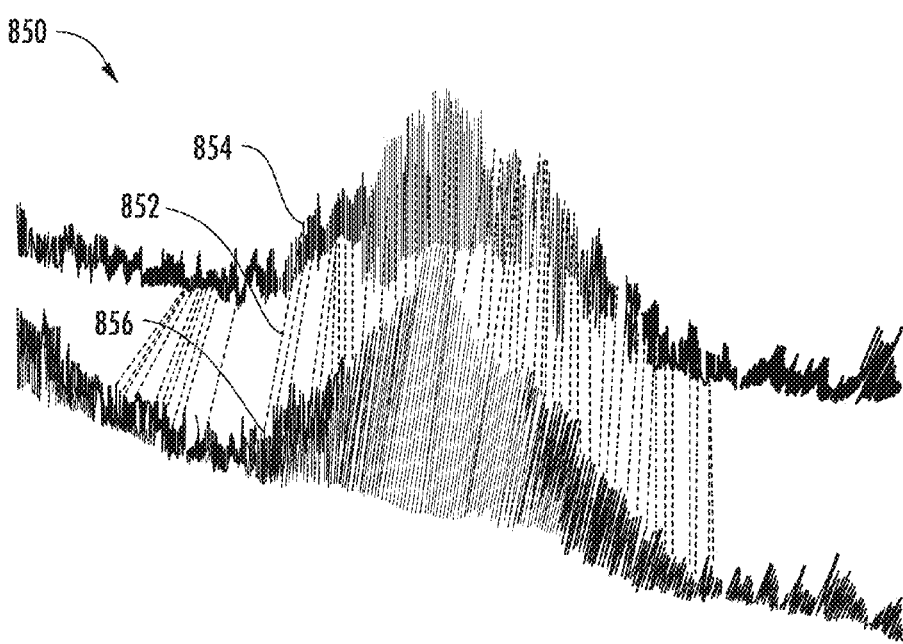
FIG. 8B depicts an illustration of a plurality of correspondences between a pair of regions of interest according to an example embodiment of the present disclosure.

As an example, FIG. 8B depicts an illustration 850 of a plurality of correspondences between a pair of regions of interest according to an example embodiment of the present disclosure. In particular, the plurality of correspondences depicted in illustration 850 can have been identified based on alignment 802 of FIG. 8A.

As shown in FIG. 8B, the correspondences are depicted as lines connecting two magnetic field readings. As an example, correspondence 852 matches magnetic field reading 854 with magnetic field reading 856. According to an aspect of the present disclosure, the plurality of correspondences can be used to revise previously determined location estimates.

Returning to FIG. 6, after the time warping algorithm has been performed at (602) to identify a first plurality of correspondences for the pair of regions of interest most recently obtained at (602), then at (606) all magnetic field readings included in one of the pair of regions of interest can be rotated 180 degrees about a vertical axis. For example, the vertical axis can be the z-axis of the local device coordinate frame. As another example, the vertical axis can be an estimated gravity vector.

More particularly, according to an aspect of the present disclosure, the dynamic time warping algorithm can be performed for each pair of regions of interest in both the forwards and backwards direction. Performing the algorithm in the backwards direction can assist in identifying correspondences associated with instances in which the device traversed the same location twice but was travelling in opposite directions. Thus, rotating all of the readings in one of the regions of interest 180 degrees can allow for consideration of such a situation.

At (608) the time warping algorithm can be performed to compare the pair of regions of interest and identify a second plurality of correspondences. Thus, the pair of regions of interest can be compared again after the rotations performed at (606). As an example, performing the time warping algorithm at (608) can include performing method (700) of FIG. 7 with respect to the pair of regions of interest as revised at (606).

At (610) it can be determined whether additional pairs of regions of interest remain that have not been compared. If it is determined that one or more pair of regions of interest remain to be compared, then method (600) can return to (602) and obtain the next pair of regions of interest.

However, if it is determined at (610) that all pairs of regions of interest have been compared then method (600) can proceed to (612). Furthermore, although method (600) shows comparison of the pairs of regions of interest performed in an iterative fashion, it should be understood that multiple pairs of regions of interest can be compared concurrently using a parallel computing architecture.

At (612) any redundant or conflicting correspondences can be removed. For example, if a multiple correspondences exist which match the same magnetic field readings together, then such redundant correspondences can be reduced to a single correspondence. As another example, if any magnetic field reading is matched to more than one other magnetic field reading by two or more correspondences, then all of the correspondences for such magnetic field reading can be deleted or removed.

At (614) a constraint can be generated for each correspondence. For example, the constraint for each correspondence can penalize a difference between the location estimates associated with the two magnetic field readings matched by such correspondence. In some implementations, the constraint for each correspondence can include a weighting factor that is proportional to the comparison score associated with such correspondence.

At (616) the location estimates associated with one or more of the magnetic field readings can be revised in light of the plurality of constraints generated at (614). In particular, the plurality of constraints can be provided to a global optimizer in addition to other data from one or more positioning systems or other data sources. The global optimizer can be implemented to improve, revise, or otherwise re-determine the plurality of location estimates associated with the plurality of magnetic field readings in light of all available data.

Generally, the inclusion of the plurality of constraints generated at (614) can result in a location path that aligns regions of interest where a strong agreement between magnetic field readings was exhibited and identified.

Figure 9A:
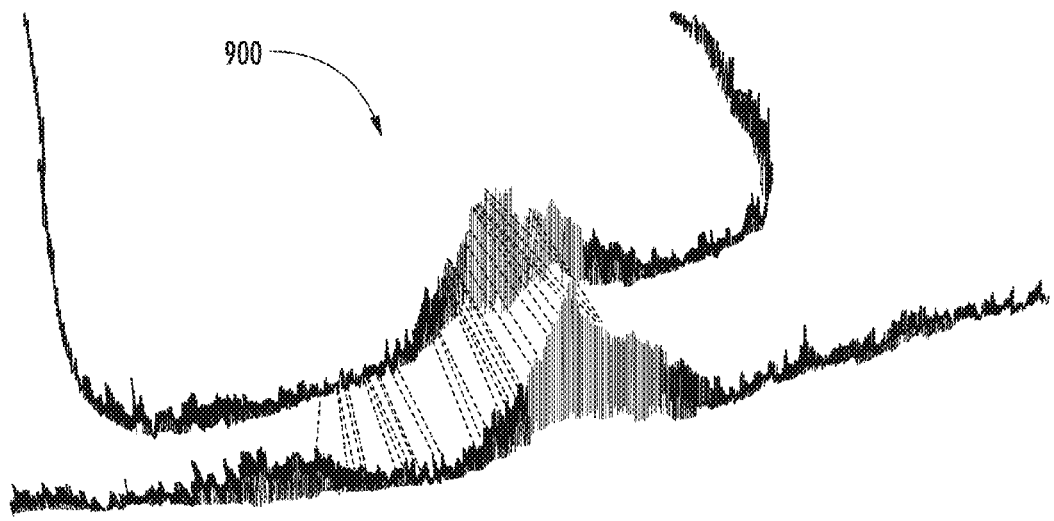
FIG. 9A depicts an illustration of a plurality of correspondences between a pair of regions of interest according to an example embodiment of the present disclosure.

As an example, FIG. 9A depicts an illustration 900 of a plurality of correspondences between a pair of regions of interest according to an example embodiment of the present disclosure.

Figure 9B:
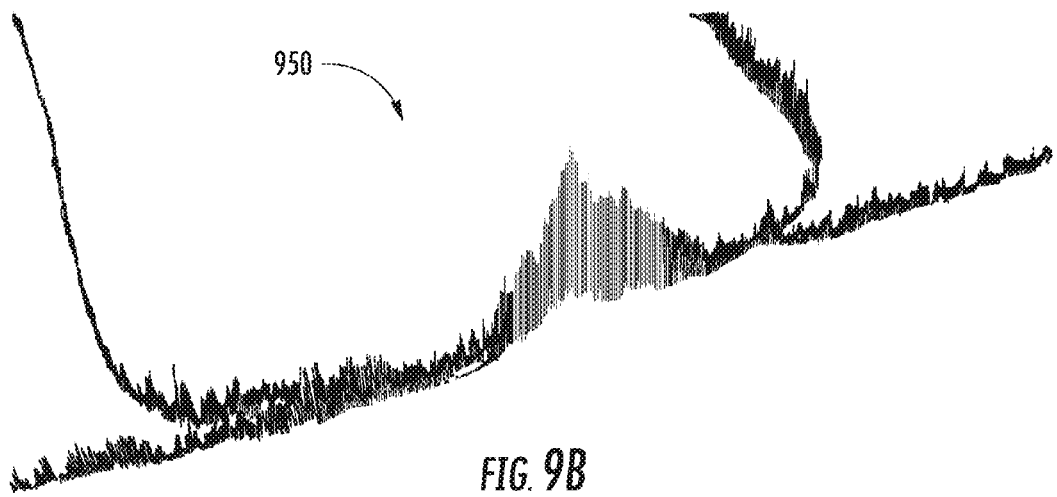
FIG. 9B depicts an illustration of a plurality of refined location estimates according to an example embodiment of the present disclosure.

FIG. 9B depicts an illustration 950 of a plurality of refined location estimates according to an example embodiment of the present disclosure. In particular, illustration 950 depicts a location path which has been revised based on the plurality of correspondences depicted in illustration 900. As can be seen, the pair of regions of interest have been aligned and moved closer together, thereby closing the location loop. In such fashion, magnetic field readings can be used to refine device location estimates.

Figure 10:
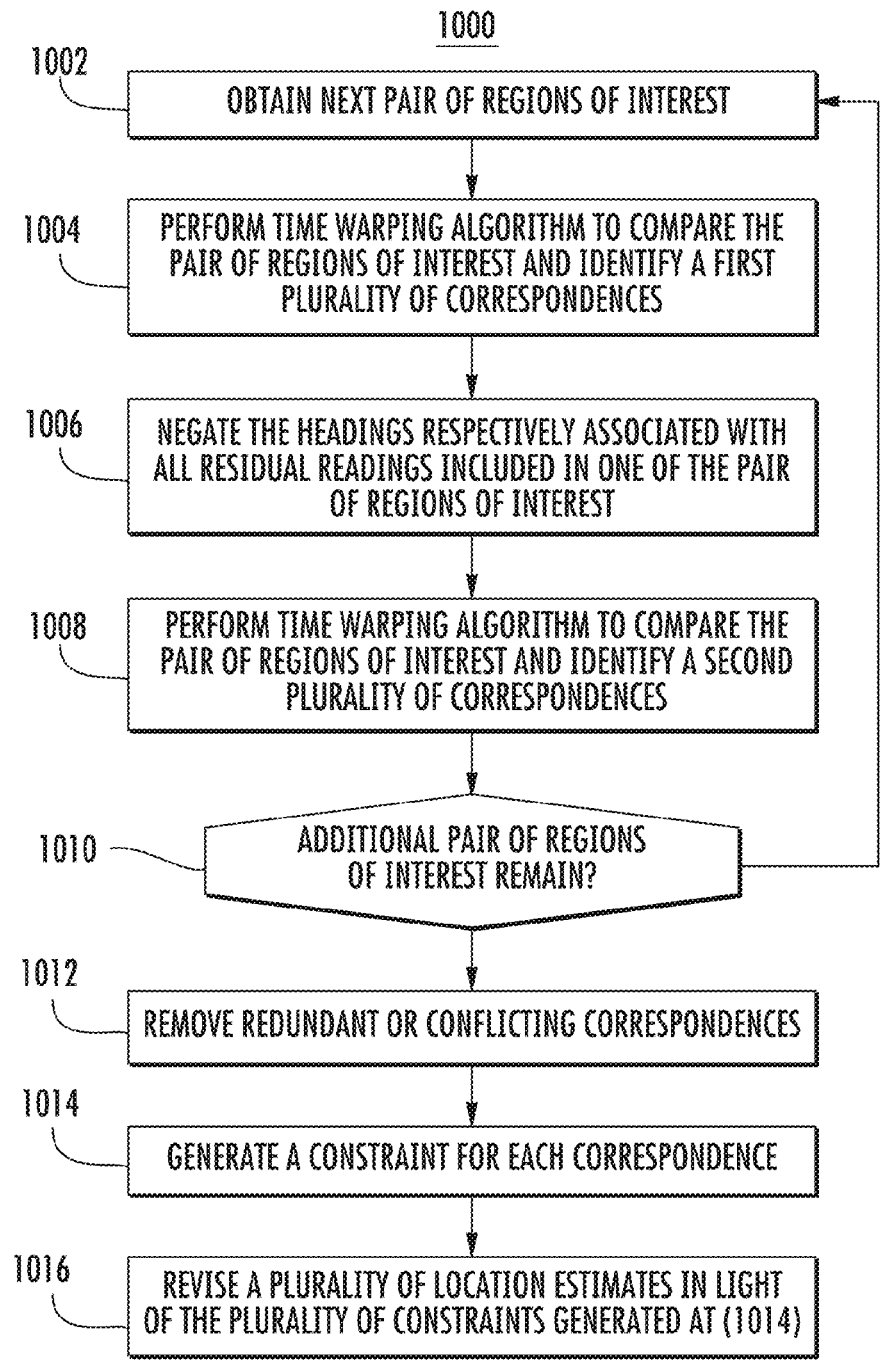
FIG. 10 depicts a flow chart of an example method for using magnetic field readings to refine device location estimates according to an example embodiment of the present disclosure.

FIG. 10 depicts a flow chart of an example method (1000) for using magnetic field readings to refine device location estimates according to an example embodiment of the present disclosure. Method (1000) can be performed by any suitable computing system, including system 200 of FIG. 2.

In particular, method (1000) can be performed to refine device location estimates in embodiments of the present disclosure in which each region of interest comprises a plurality of residual readings (e.g., with the Earth contribution removed) and their associated location estimate data. For example, each residual reading can be a three-dimensional residual reading vector expressed within a global coordinate frame.

In addition, FIG. 10 depicts steps performed in a particular order for purposes of illustration and discussion. Those of ordinary skill in the art, using the disclosures provided herein, will understand that the various steps method (1000) can be omitted, adapted, and/or rearranged in various ways without departing from the scope of the present disclosure.

At (1002) the next pair of regions of interest can be obtained or otherwise considered. For example, a plurality of pairs of regions of interest can be formed and ordered into a sequence according to any logic. Each pair of region of interest can be then considered individually.

At (1004) a time warping algorithm can be performed to compare the pair of regions of interest most recently obtained at (1002). The result of performing the time warping algorithm can be the identification of a first plurality of correspondences.

Figure 11:
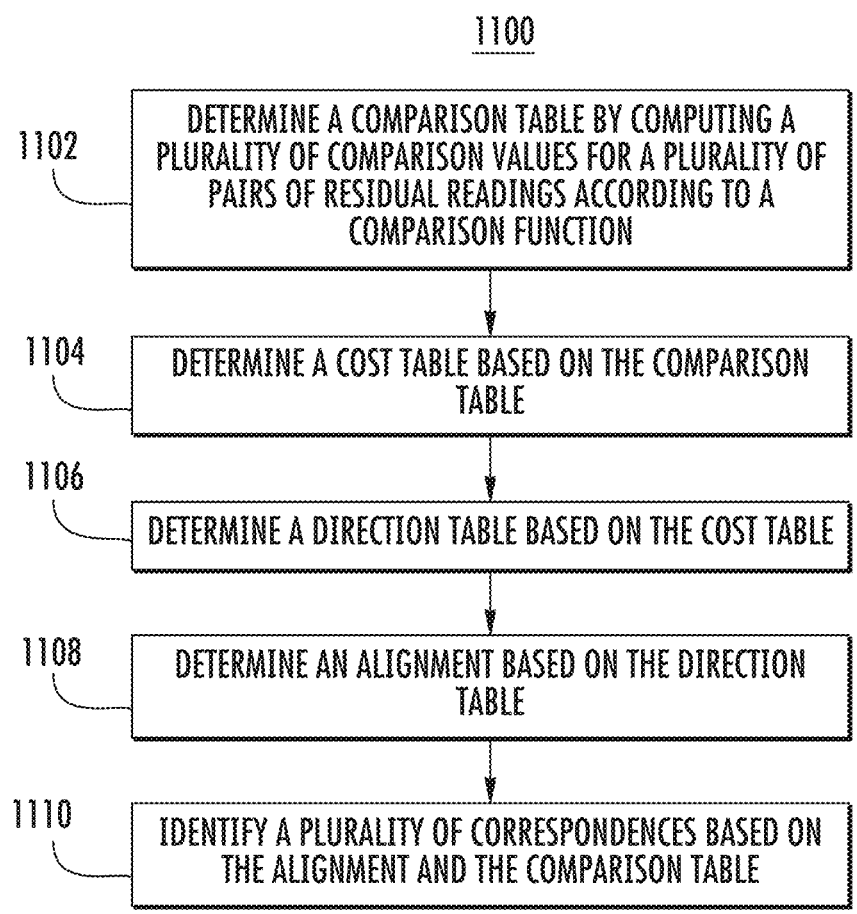
FIG. 11 depicts a flow chart of an example method for comparing a pair of regions of interest according to an example embodiment of the present disclosure.

As an example, FIG. 11 depicts a flow chart of an example method for comparing a pair of regions of interest according to an example embodiment of the present disclosure. Method (1100) can be performed by any suitable computing system, including system 200 of FIG. 2.

In particular, method (1100) can be performed to compare a pair of regions of interest in embodiments of the present disclosure in which each region of interest comprises a plurality of residual readings (e.g., with the Earth contribution removed) and their associated location estimate data. For example, each residual reading can be a three-dimensional residual reading vector expressed within a global coordinate frame.

In addition, FIG. 11 depicts steps performed in a particular order for purposes of illustration and discussion. Those of ordinary skill in the art, using the disclosures provided herein, will understand that the various steps method (1100) can be omitted, adapted, and/or rearranged in various ways without departing from the scope of the present disclosure.

At (1102) a comparison table can be determined by computing a plurality of comparison values for a plurality of pairs of residual readings according to a comparison function. In particular, the plurality of pairs of residual readings can include each residual reading included in a first region of interest respectively paired with each residual reading included in a second region of interest.

As an example, if the first region of interest being compared contains a first number (N) of residual readings and the second region of interest being compared contains a second number (M) of residual readings, then the comparison table determined at (1102) can be of size N*M. For example, an example comparison table can have N rows and M columns and can hold a comparison value (COMPARE(i, j)) for each of the plurality of pairs of readings (1≤i≤N, 1≤j≤M). However, the comparison table does not necessarily have any particular formatting, but rather, in some implementations, can exist solely as a plurality of comparison values stored in memory and associated with a particular pair of residual readings.

The comparison value computed for each pair of residual readings can be computed according to a comparison function. As an example, the comparison function can output a comparison value for two input residual readings by computing a weighted sum of a squared difference between the two input residual readings, a squared distance between two location estimates respectively associated with the two input residual readings, and a squared difference between two headings respectively associated with the two input residual readings.

The squared difference between the two input residual readings can be obtained by, for example, performing vector subtraction and then squaring the result.

The heading for each residual reading can have been determined by, for example, forming a difference vector describing a change between the location estimate of the previous residual reading included in the region of interest and the location estimate of the residual reading. The difference vector can then be normalized to obtain the heading. As an example, the heading for a particular residual reading (i) can be a normalized difference vector describing a change in location between the location estimate of residual reading (i−1) and residual reading (i).

Further, with respect to the comparison function, the squared difference between the two headings respectively associated with the two input residual readings can be computed by, for example, performing vector subtraction of the two heading vectors and then squaring the result.

Thus, because the residual readings provide an indication of the magnetic field disturbance expressed within the global coordinate frame, heading data for each residual reading can be considered by the comparison function so as to include a component comparing direction of travel. In such fashion, the possibility of correspondences being identified based on the device traversing the same location twice but travelling in perpendicular directions can be reduced.

The weightings used in the comparison function can be adjusted to provide an appropriate weight for each component of the comparison function.

At (1104) a cost table can be determined based on the comparison table. As an example, the cost table can have N rows and M columns and can hold a final cost value (COST(i, j)) for each of the plurality of pairs of residual readings (1≤i≤N, 1≤j≤M). However, the cost table does not necessarily have any particular formatting, but rather, in some implementations, can exist solely as a plurality of final cost values stored in memory and associated with a particular pair of residual readings.

The final cost value for each of the plurality of pairs of residual readings can be determined by selecting the minimum of a first cost value (C1), a second cost value (C2), and a third cost value (C3). For example, the first, second, and third cost values can have the following identities:

$C1(i,j)=COST(i-1,j)+SKIPCOST;$ $C2(i,j)=COST(i-1,j-1)+COMPARE(i,j);$ $C3(i,j)=COST(i,j-1)+SKIPCOST;$

According to an aspect of the present disclosure, the skipcost value (SKIPCOST) can be a constant value. Thus, the skipcost value can represent the cost of skipping a residual reading in one of the regions of interest being compared. Such inclusion of the skipcost value in the first and third cost values contrasts with certain existing time warping algorithms and provides the benefit of allowing the time warping algorithm to identify improved subsequences or sub-alignments while skipping through portions where a satisfactory alignment is not present.

According to another aspect of the present disclosure, the magnitude of the skipcost value can be adjusted to allow more or less skipping by the time warping algorithm. For example, a larger skipcost value will result in increased selection of the second cost value as the final cost value (e.g., less skipping).

At (1106) a direction table can be determined based on the cost table. As an example, the direction table can have N rows and M columns and can hold a direction value (DIR(i, j)) for each of the plurality of pairs of readings (1≤i≤N, 1≤j≤M). However, the direction table does not necessarily have any particular formatting, but rather, in some implementations, can exist solely as a plurality of direction values stored in memory and associated with a particular pair of residual readings.

The direction value for each of the plurality of pairs of readings can be determined based on the selection of final cost value performed at (1104). For example, the direction value for each of the plurality of pairs of readings can be determined according to the following:

$DIR(i,j)=(-1,0)$ if $COST(i,j)=C1(i,j);$ $DIR(i,j)=(-1,-1)$ if $COST(i,j)=C2(i,j);$ $DIR(i,j)=(0,-1)$ if $COST(i,j)=C3(i,j);$

Thus, the direction values of the direction table can provide an indication of the relationship selected by the corresponding cost value in the cost table.

At (1108) an alignment can be determined based on the direction table. For example, the alignment can be determined by starting at the end of the two regions of interest being compared (e.g. at (N, M)) and then traversing the direction table according to the direction values. In particular, if the direction value at a given pair of residual readings is (−1, 0), then the alignment can take a leftwards step; if the direction value is (−1, −1), then the alignment can take a diagonal step; and if the direction value is (0, −1), then the alignment can take a downwards step.

However, it will be understood that such step directions are provided by way of example and that determination of the alignment at (1108) can be performed without creation of a table according to a particular formatting. As an example, if the direction value at a pair of residual readings (i, j) traversed by the alignment is (−1, −1), then the alignment can be determined to proceed to the pair of residual readings (i−1, j−1).

Furthermore, although determination of the cost table and the direction table are presented in method (1100) as discrete steps, it will be appreciated that, in some implementations, the cost value and direction value for each pair of residual readings can be determined at the same time such that cost table and the direction table are concurrently determined.

At (1110) a plurality of correspondences can be identified based on the alignment determined at (1108) and the comparison table determined at (1102). In particular, a correspondence can be emitted or otherwise identified for each instance in which the direction value for pair of residual readings traversed by the alignment determined at (1108) provides a diagonal step and the comparison value is less than the skipcost value. In other words, a correspondence can be emitted for each pair of residual readings traversed by the alignment for which DIR(i, j)=(−1, −1) and COMPARE(i, j)<SKIPCOST. The second requirement that the comparison value be less than the skipcost value ensures that correspondences are only emitted when the pair of residual readings represent a match of acceptable quality and, therefore, avoids emitting correspondences when a diagonal step is taken only to achieve an improved global alignment.

Returning to FIG. 10, after the time warping algorithm has been performed at (1002) to identify a first plurality of correspondences for the pair of regions of interest most recently obtained at (1002), then at (1006) the headings respectively associated with all the residual readings included in one of the pair of regions of interest can be negated.

More particularly, according to an aspect of the present disclosure, the dynamic time warping algorithm can be performed for each pair of regions of interest in both the forwards and backwards direction. Performing the algorithm in the backwards direction can assist in identifying correspondences associated with instances in which the device traversed the same location twice but was travelling in opposite directions. Thus, negating the headings of all residual readings in one of the regions of interest can allow for consideration of such a situation.

At (1008) the time warping algorithm can be performed to compare the pair of regions of interest and identify a second plurality of correspondences. Thus, the pair of regions of interest can be compared again after the negation performed at (1006). As an example, performing the time warping algorithm at (1008) can include performing method (1100) of FIG. 11 with respect to the pair of regions of interest as revised at (1006).

At (1010) it can be determined whether additional pairs of regions of interest remain that have not been compared. If it is determined that one or more pair of regions of interest remain to be compared, then method (1000) can return to (1002) and obtain the next pair of regions of interest.

However, if it is determined at (1010) that all pairs of regions of interest have been compared then method (1000) can proceed to (1012). Furthermore, although method (1000) shows comparison of the pairs of regions of interest performed in an iterative fashion, it should be understood that multiple pairs of regions of interest can be compared concurrently using a parallel computing architecture.

At (1012) any redundant or conflicting correspondences can be removed. For example, if a multiple correspondences exist which match the same residual readings together, then such redundant correspondences can be reduced to a single correspondence. As another example, if any residual reading is matched to more than one other residual reading by two or more correspondences, then all of the correspondences for such residual reading can be deleted or removed.

At (1014) a constraint can be generated for each correspondence. For example, the constraint for each correspondence can penalize a difference between the location estimates associated with the two residual readings matched by such correspondence. In some implementations, the constraint for each correspondence can include a weighting factor that is inversely proportional to the comparison score associated with such correspondence.

At (1016) the location estimates associated with one or more of the residual readings can be revised in light of the plurality of constraints generated at (1014). In particular, the plurality of constraints can be provided to a global optimizer in addition to other data from one or more positioning systems or other data sources. The global optimizer can be implemented to improve, revise, or otherwise re-determine the plurality of location estimates associated with the plurality of residual readings in light of all available data.

Generally, the inclusion of the plurality of constraints generated at (1014) can result in a location path that aligns regions of interest where a strong agreement between residual readings was exhibited and identified.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for revising location estimates, the method comprising:

obtaining, by one or more computing devices, a plurality of readings of a magnetic field collected by a magnetometer of a device, wherein the plurality of readings are respectively associated with a plurality of location estimates of the device along a location path, wherein each of the one or more computing devices comprises one or more processors;

identifying, by the one or more computing devices, a plurality of regions of interest of the plurality of readings along the location path;

comparing, by the one or more computing devices, each of the plurality of regions of interest of the plurality of readings with at least one other of the plurality of regions of interest to identify a plurality of correspondences; and revising, by the one or more computing devices, at least one of the plurality of location estimates based at least in part on the plurality of correspondences.

2. The method of claim 1, wherein:

the plurality of readings of the magnetic field are collected by the magnetometer of the device during a single data collection run;

the device travels along the location path during the single data collection run; and revising, by the one or more computing devices, at least one of the plurality of location estimates based at least in part on the plurality of correspondences comprises closing, by the one or more computing devices, at least one location overlap exhibited by the location path.

3. The method of claim 1, wherein comparing, by the one or more computing devices, each region of interest with at least one other region of interest comprises performing, by the one or more computing devices, a time warping algorithm for each region of interest with respect to the other region of interest to identify the plurality of correspondences.

4. The method of claim 3, wherein performing, by the one or more computing devices, the time warping algorithm for each region of interest with respect to the other region of interest comprises:

determining, by the one or more computing devices, a comparison table by computing a plurality of comparison values according to a comparison function, wherein the plurality of comparison values are respectively computed for a plurality of pairs of readings, and wherein the plurality of pairs of readings comprise each reading from the region of interest paired with each reading from the other region of interest;

determining, by the one or more computing devices, a cost table based at least in part on the comparison table;

determining, by the one or more computing devices, a direction table based at least in part on the cost table; and identifying, by the one or more computing devices, the plurality of correspondences based at least in part on the direction table.

5. The method of claim 4, wherein the comparison function comprises a weighted sum of a squared difference between a first input reading and a second input reading and a squared distance between a first location estimate and a second location estimate respectively associated with the first input reading and the second input reading.

6. The method of claim 4, wherein determining, by the one or more computing devices, the cost table based at least in part on the comparison table comprises:

computing, by the one or more computing devices, a first, second, and third cost value for each of the plurality of pairs of readings; and respectively selecting, by the one or more computing devices, the minimum of the first, second, and third cost values for each of the plurality of pairs of readings as the final cost value for such pair of readings;

wherein each pair of readings comprises a first paired reading that is included in the region of interest and a second paired reading that is included in the other region of interest;

wherein the first cost value for each pair of readings comprises the sum of a skipcost value and the final cost value associated with the second paired reading and a first neighbor reading, wherein the first neighbor reading for each pair of readings comprises the previous sequential reading with respect to the first paired reading in the region of interest;

wherein the third cost value for each pair of readings comprises the sum of the skipcost value and the final cost value associated with the first paired reading and a second neighbor reading, wherein the second neighbor reading for each pair of readings is the previous sequential reading with respect to the second paired reading in the other region of interest;

wherein the second cost value for each pair of readings comprises the sum of the comparison value associated with such pair of readings and the final cost value associated with the first and second neighbor readings; and wherein the skipcost value comprises a constant value.

7. The method of claim 6, wherein determining, by the one or more computing devices, the direction table based at least in part on the cost table comprises:

respectively selecting, by the one or more computing devices for each of the plurality of pairs of readings, a leftwards step value if the first cost value was selected as the final cost value for such pair of readings;

respectively selecting, by the one or more computing devices for each of the plurality of pairs of readings, a diagonal step value if the second cost value was selected as the final cost value for such pair of readings; and respectively selecting, by the one or more computing devices for each of the plurality of pairs of readings, a downwards step value if the third cost value was selected as the final cost value for such pair of readings.

8. The method of claim 7, wherein identifying, by the one or more computing devices, the plurality of correspondences based at least in part on the direction table comprises:

determining, by the one or more computing devices, an alignment by traversing the direction table according to the directional step values; and identifying, by the one or more computing devices, one of the plurality of correspondences at each instance in which the alignment travels according to a diagonal step value and the comparison value for the pair of readings that provide the diagonal step value is less than the skipcost value.

9. The method of claim 1, wherein:

each region of interest comprises selected of the plurality of readings; and comparing, by the one or more computing devices, each region of interest with at least one other region of interest comprises, for each region of interest:

performing, by the one or more computing devices, a time warping algorithm for the region of interest with respect to the at least one other region of interest;

respectively rotating, by the one or more computing devices, the plurality of readings included in the region of interest about a vertical axis by one-hundred and eighty degrees; and after respectively rotating the plurality of readings, performing, by the one or more computing devices, the time warping algorithm for the rotated region of interest with respect to the at least one other region of interest.

10. A system for revising location estimates, comprising:

one or more computing devices; and at least one memory storing instructions that, when executed by the one or more computing devices, cause the one or more computing devices to perform operations, the operations comprising:

obtaining a plurality of magnetic field readings, wherein the plurality of magnetic field readings are respectively associated with a plurality of location estimates along a location path and a plurality of orientations;

identifying a first region of interest along the location path by respectively selecting a first plurality of the magnetic field readings surrounding a first location estimate;

identifying a second region of interest along the location path by respectively selecting a second plurality of the magnetic field readings surrounding a second location estimate; and identifying a plurality of correspondences by performing a time warping algorithm to compare the first region of interest with the second region of interest.

11. The system of claim 10, wherein:

the plurality of magnetic field readings are collected by a magnetometer of a device during a single data collection run;

the device travels along the location path during the single data collection run; and the at least one memory stores further instructions that, when executed by the one or more computing devices, cause the one or more computing devices to perform further operations, the further operations comprising closing at least one location overlap exhibited by the location path based at least in part on the plurality of correspondences.

12. The system of claim 10, wherein:

the first plurality of the magnetic field readings included in the first region of interest comprises a first number (N) of magnetic field readings;

the second plurality of the magnetic field readings included in the second region of interest comprises a second number (M) of magnetic field, readings; and identifying the plurality of correspondences by performing the time warping algorithm to compare the first region of interest with the second region of interest comprises determining a comparison table holding a comparison value (COMPARE(i, j)) according to a comparison function for each of a plurality of pairs of magnetic field readings (1≤i≤N, 1≤j≤M), such that the comparison table is of size N times M.

13. The system of claim 12, wherein identifying the plurality of correspondences by performing the time warping algorithm to compare the first region of interest with the second region of interest further comprises determining a cost table based at least in part on the comparison table by computing a cost value (COST(i, j)) for each of the plurality of pairs of magnetic field readings.

14. The system of claim 13, wherein the cost value for each of pair of magnetic field readings (1≤i≤N, 1≤j≤M) comprises the minimum of a C1 value, a C2 value, or a C3 value, and wherein:

$C1(i,j) = COST(i-1,j) + SKIPCOST;$ $C2(i,j) = COST(i-1,j-1) + COMPARE(i,j);$ $C3(i,j) = COST(i,j-1) + SKIPCOST;$ and SKIPCOST comprises an adjustable constant value.

15. The system of claim 14, wherein identifying the plurality of correspondences by performing the time warping algorithm to compare the first region of interest with the second region of interest further comprises determining a direction table based at least in part on the cost table by selecting a direction value (DIR(i, j)) for each of the plurality of pairs of magnetic field readings (1≤i≤N, 1≤j≤M), wherein:

$DIR(i,j) = (-1,0)$ if $COST(i,j) = C1(i,j);$ $DIR(i,j) = (-1,-1)$ if $COST(i,j) = C2(i,j);$ $DIR(i,j) = (0,-1)$ if $COST(i,j) = C3(i,j).$

16. The system of claim 15, wherein identifying the plurality of correspondences by performing the time warping algorithm to compare the first region of interest with the second region of interest further comprises:
determining an alignment by beginning at (N, M) of the direction table and traversing the direction table according to the direction values; and
identifying one of the plurality of correspondences for each of the plurality of pairs of magnetic field readings that are traversed by the alignment, for which the corresponding direction value equals (−1, −1), and for which the corresponding comparison value is less than SKIPCOST.

17. The system of claim 12, wherein the comparison function comprises a weighted sum of a squared difference between a first input magnetic field reading and a second input magnetic field reading and a squared distance between a first location estimate and a second location estimate respectively associated with the first and second input magnetic field readings.

18. A non-transitory computer-readable medium storing instructions that, when executed by one or more computing devices, cause the one or more computing devices to perform operations, the operations comprising:
obtaining a plurality of magnetic field readings along a device location path;
identifying a plurality of regions of interest along the location path within the plurality of magnetic field readings;
comparing each magnetic field reading within each of the plurality of regions of interest to each magnetic field reading within at least one other of the plurality of regions of interest to identify a plurality of correspondences, wherein each of the plurality of correspondences matches one of the plurality of magnetic field readings to another one of the plurality of magnetic field readings.

19. The non-transitory computer-readable medium of claim 18, wherein:
comparing each magnetic field reading within each of the plurality of regions of interest to each magnetic field reading within at least one other of the plurality of regions of interest to identify the plurality of correspondences comprises computing a comparison score for each magnetic field reading within each of the plurality of regions of interest with respect to each magnetic field reading within at least one other of the plurality of regions of interest according to a comparison function; and
the comparison function comprises a weighted sum of a squared difference between two input magnetic field readings, a squared distance between two location estimates respectively associated with the two input magnetic field readings, and a squared difference between two headings respectively associated with the two input magnetic field readings.

20. The non-transitory computer-readable medium of claim 19, wherein comparing each magnetic field reading within each of the plurality of regions of interest to each magnetic field reading within at least one other of the plurality of regions of interest to identify a plurality of correspondences further comprises identifying a plurality of pairs of magnetic field readings respectively having a comparison score that is less than a threshold value.

* * * * *